(12) United States Patent
Lee (10) Patent No.: US 11,027,203 B2
(45) Date of Patent: Jun. 8, 2021

(54) GAME SYSTEM AND GAME PROVIDING METHOD USING THE SYSTEM

(71) Applicant: NHN Entertainment Corporation, Seongnam-si (KR)

(72) Inventor: Dong Jin Lee, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 51 days.

(21) Appl. No.: 15/977,101

(22) Filed: May 11, 2018

(65) Prior Publication Data
US 2018/0326306 A1 Nov. 15, 2018

(30) Foreign Application Priority Data

May 12, 2017 (KR) .......................... 10-2017-0059030

(51) Int. Cl.
| | |
|---|---|
| *A63F 13/795* | (2014.01) |
| *A63F 13/92* | (2014.01) |
| *A63F 13/822* | (2014.01) |
| *A63F 13/847* | (2014.01) |
| *A63F 13/352* | (2014.01) |
| *A63F 13/335* | (2014.01) |

(52) U.S. Cl.
CPC .......... *A63F 13/795* (2014.09); *A63F 13/352* (2014.09); *A63F 13/822* (2014.09); *A63F 13/847* (2014.09); *A63F 13/92* (2014.09); *A63F 13/335* (2014.09)

(58) Field of Classification Search
CPC .... A63F 13/795; A63F 13/352; A63F 13/822; A63F 13/847; A63F 13/92; A63F 13/335

USPC .......................................................... 463/29
See application file for complete search history.

(56) References Cited

U.S. PATENT DOCUMENTS

| | | | |
|---|---|---|---|
| 7,278,921 B1 * | 10/2007 | Fujisawa ................ | G06Q 40/04 463/42 |
| 8,328,643 B1 * | 12/2012 | Osvald ................. | G06Q 10/101 463/42 |
| 8,500,548 B2 * | 8/2013 | Baerlocher ......... | G07F 17/3244 463/25 |
| 8,790,186 B1 * | 7/2014 | Dethloff ................ | A63F 13/332 463/42 |
| 2002/0160824 A1 * | 10/2002 | Goto ....................... | A63F 13/12 463/9 |
| 2003/0064807 A1 * | 4/2003 | Walker ................ | G07F 17/3237 463/42 |

(Continued)

*Primary Examiner* — Allen Chan
(74) *Attorney, Agent, or Firm* — H.C. Park & Associates, PLC (57) ABSTRACT

A game system capable of more easily recruiting game players and a game progress method using the game system is disclosed. The game system includes: a game server providing an online game; an external server for providing a communication service; a recruiting user terminal creating a party of the online game, transmitting the generated party to the game server, creating a party member recruitment announcement including information on a participation condition of the party, and transmitting the party member recruitment announcement to the external server; and at least one participating user terminal receiving the party member recruitment announcement from the external server and transmitting user game information for participating in the party to the game server in response to the received party member recruitment announcement.

8 Claims, 6 Drawing Sheets

(56) References Cited

U.S. PATENT DOCUMENTS

| | | | |
|---|---|---|---|
| 2006/0287096 A1* | 12/2006 | O'Kelley, II | A63F 13/12 |
| | | | 463/42 |
| 2007/0173324 A1* | 7/2007 | Multerer | A63F 13/12 |
| | | | 463/42 |
| 2008/0194332 A1* | 8/2008 | Kadikario | A63F 13/79 |
| | | | 463/42 |

\* cited by examiner

GAME SYSTEM AND GAME PROVIDING METHOD USING THE SYSTEM

CROSS REFERENCE TO RELATED APPLICATIONS

This application claims priority from and the benefit of Korean Patent Application No. 10-2017-0059030, filed on May 12, 2017, which is hereby incorporated by reference for all purposes as if fully set forth herein.

BACKGROUND

Field

The present invention relates to a game system and a game providing method using the game system, and more particularly, to a game system capable of collecting game users with a party created in an online game and a game providing method using the game system.

Discussion of the Background

Recently, various kinds of online games are being developed. For example, online games such as massively multiplayer online role playing games (MMORPG, also referred to as a "multi-connection role playing game"), and middle core games have become more and more sophisticated. The multi-connection role playing game is a hard core game in which a plurality of players participate to perform various on-line role playing. The middle core game is an intermediate form between a casual game and a hard core game, which targets users who feel uncomfortable playing a hardcore game and are not interested in playing a casual game.

Meanwhile, the multi-connection role playing game and the middle core game may require cooperative play of a plurality of players due to game complexity and difficulty. In other words, if you need cooperative play within the above games, you should organize a party by recruiting users to play together.

As a method of forming a party in a game, it is common to arrange a party by recruiting desired users through communication in the game. However, since such recruitment method is available only in the game, it may be difficult to recruit a party member meeting the participation conditions or to search for a party to be affiliated with.

On the other hand, although it is possible to recruit party members or to find a desired party in an area, where communication among users is easy, such as the web or an application, such a method of forming a party can have problems due to poor game-connectivity when the web or the application is disconnected from the information of the corresponding game.

The above information disclosed in this Background section is only for enhancement of understanding of the background of the inventive concepts, and, therefore, it may contain information that does not form the prior art that is already known in this country to a person of ordinary skill in the art.

SUMMARY

Exemplary embodiments of the invention provide a game system capable of collecting game users with a party created in an online game and a game providing method using the game system.

Additional features of the invention will be set forth in the description which follows, and in part will be apparent from the description, or may be learned by practice of the invention An exemplary embodiment of the invention discloses a game system that includes: a game server providing an online game; an external server for providing a communication service; a recruiting user terminal creating a party of the online game, transmitting the generated party to the game server, creating a party member recruitment announcement including information on a participation condition of the party, and transmitting the party member recruitment announcement to the external server; and at least one participating user terminal receiving the party member recruitment announcement from the external server and transmitting user game information for participating in the party to the game server in response to the received party member recruitment announcement. The game server transmits a participating admission message to the participating user terminal if the user game information satisfies the participation condition.

The game server may transmit information on a user who is allowed to participate in the party to the recruiting user terminal.

The game server may transmit to the participating user terminal a participation rejection message to the party when the user game information is judged not to satisfy the participation condition.

The game server may transmit a party executable message to the participating user terminal of the user allowed to participate in the party if it is determined that the number of users allowed to participate in the party is greater than or equal to a minimum number for executing the online game in association with the party.

An exemplary embodiment of the invention discloses a method for providing a game service performed by a game server providing an arbitrary online game, including: receiving a party of the online game from the recruiting user terminal; receiving user game information for participating in the party from at least one participating user terminal which has received a party member recruitment announcement from an external server, the party member recruitment announcement including information on participation conditions to the party; and transmitting to the participating user terminal a participation admission message to the party if the user game information satisfies the participation condition.

The method may further include transmitting information on a user who is allowed to participate in the party to the recruiting user terminal or the participating user terminal.

The method may further include transmitting to the participating user terminal a participation rejection message if it is determined that the user game information does not satisfy the participation condition.

The method may further include transmitting a party executable message to the participating user terminal of the user allowed to participate in the party if it is determined that the number of users allowed to participate in the party is greater than or equal to a minimum number for executing the online game in association with the party.

The foregoing general description and the following detailed description are exemplary and explanatory and are intended to provide further explanation of the claimed subject matter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, regions, and/or aspects of the various illustrations may be otherwise combined, separated, interchanged, and/or rearranged without departing from the disclosed exemplary embodiments. Further, in the accompanying figures, the size and relative sizes of elements may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
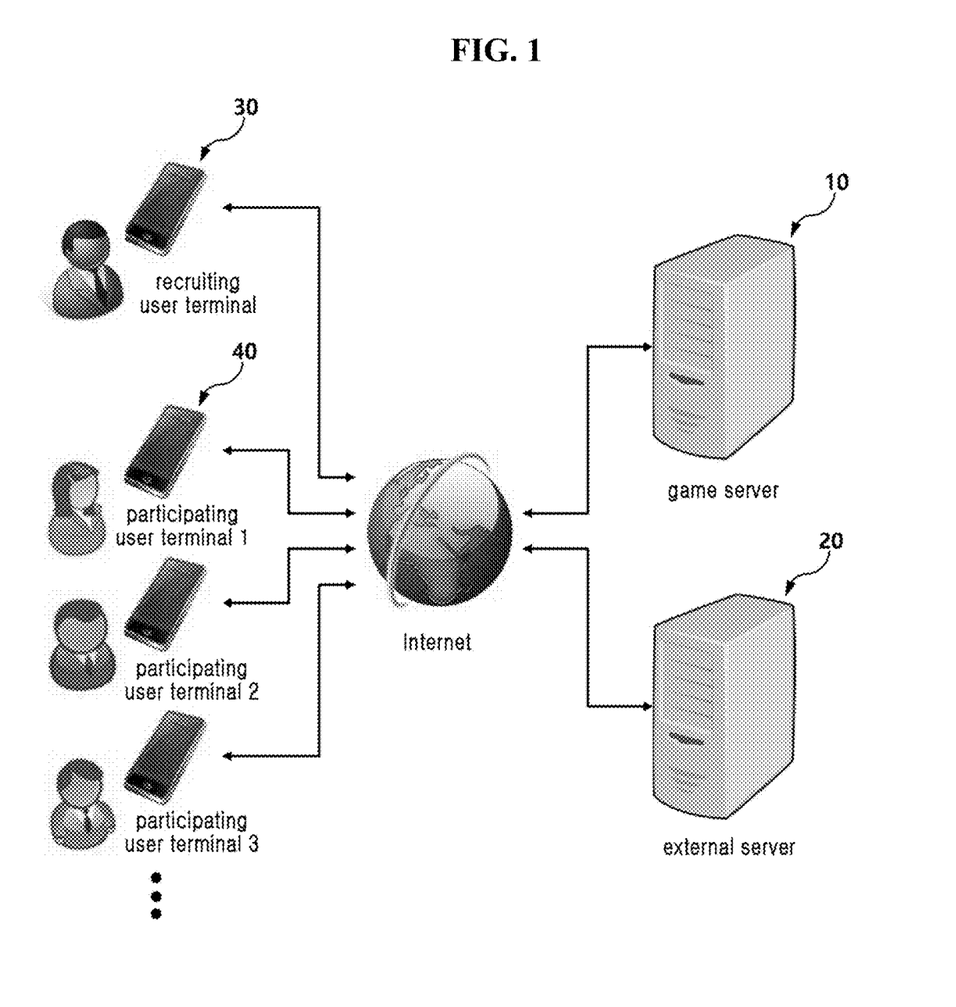
FIG. 1 is a conceptual diagram illustrating a game system according to an embodiment of the invention.

FIG. 1 is a conceptual diagram illustrating a game system according to an embodiment of the invention.

Referring to FIG. 1, the game system according to the present exemplary embodiment includes a game server 10, an external server 20, a recruiting user terminal 30, and at least one participating user terminal 40.

The game server 10 may be a computer system that provides an online game through the Internet. At this time, the online game may be, for example, a massively multiplayer online role playing game (MMORPG), a middle core game, or the like.

The external server 20 may be a computer system for providing a communication service through the Internet, for example, a web server, an application server, a social network service (SNS) server, or the like.

The recruiting user terminal 30 is a user terminal configured with software for creating a party and recruiting party members in the online game. The recruiting user terminal 30 may be a computer system or a smart device capable of exchanging signals with the game server 10 or the external server 20 via the Internet, and executing the online game. At this time, the smart device may include a smart phone, a tablet PC, and the like capable of running an application program.

The participating user terminal 40 is a user terminal capable of participating in the party created in the online game. The participating user terminal 40 can be a computer system capable of exchanging signals with the game server 10 or the external server 20 via the Internet, and executing the online game. At this time, the smart device may include a smart phone, a tablet PC, and the like capable of running an application program.

Hereinafter, a game providing method using the game system will be described in detail.

Figure 2:
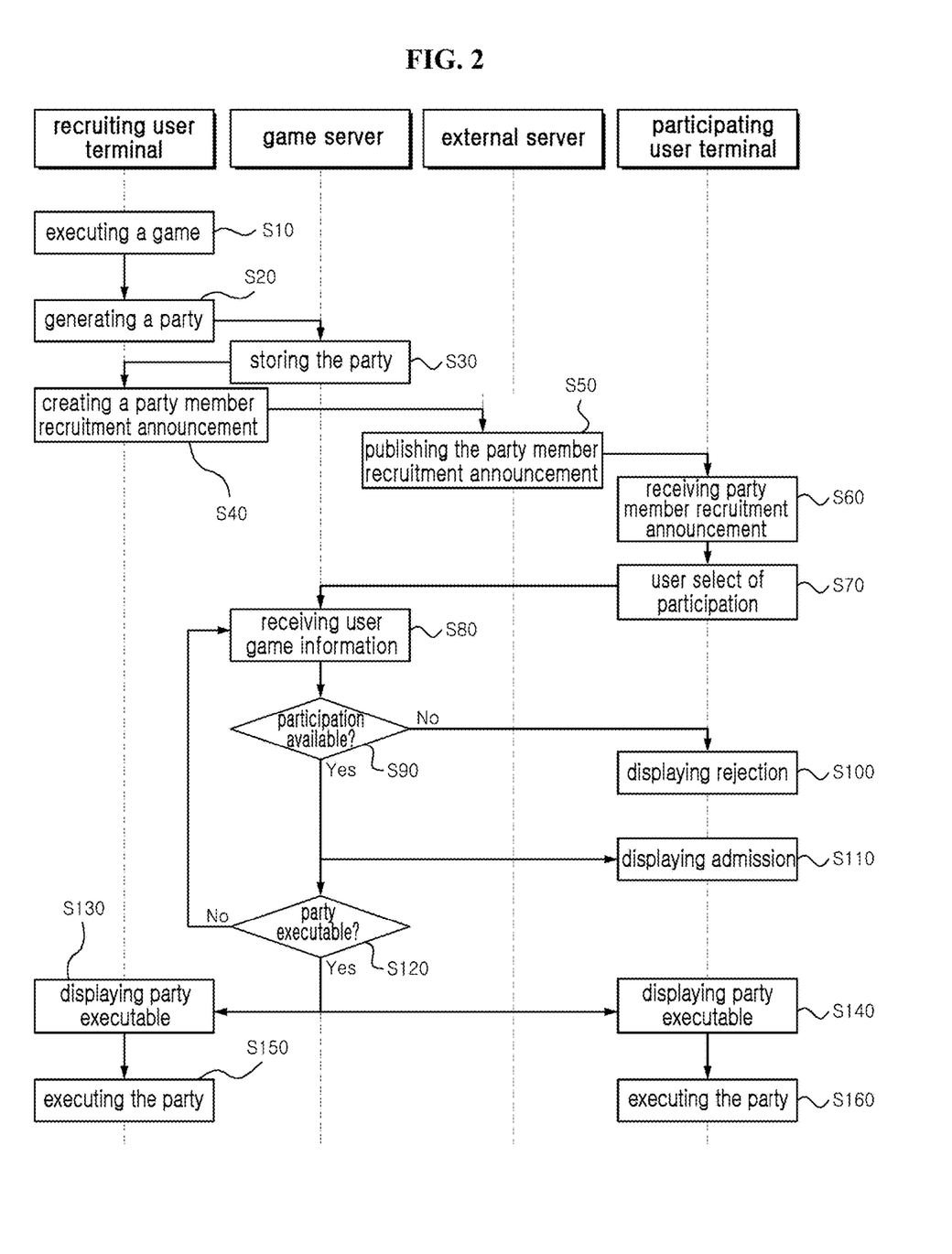
FIG. 2 is a flowchart for explaining a game providing method using the game system of FIG. 1.

FIG. 2 is a flowchart for explaining a game providing method using the game system of FIG. 1.

Referring to FIG. 2, in the game providing method according to the present exemplary embodiment, the recruiting user terminal 30 accesses the game server 10 to execute the online game (S10). At this time, the recruiting user terminal 30 must have the online game installed in advance.

Figure 3:
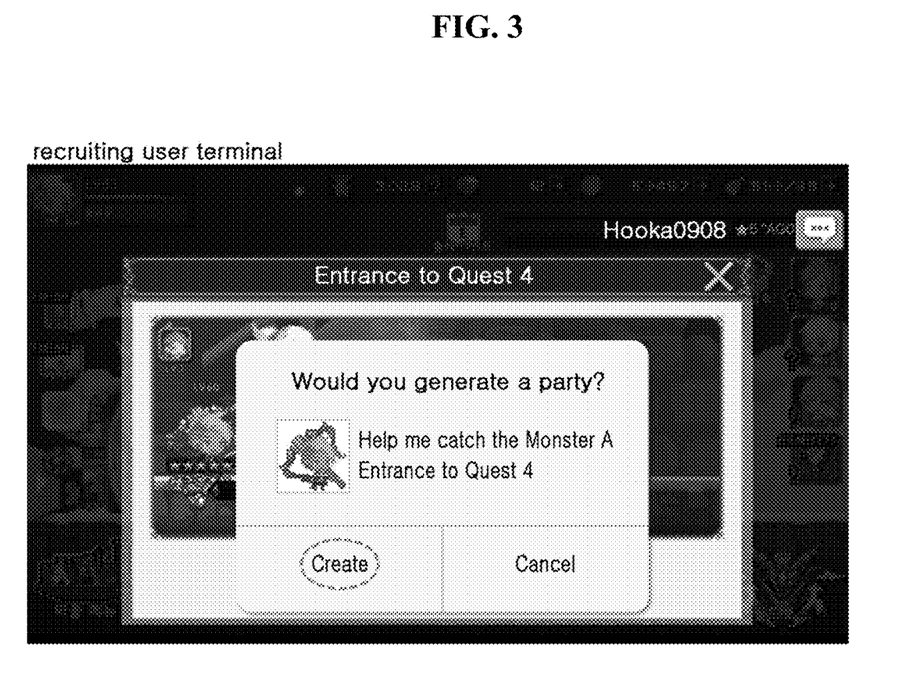
FIG. 3 is an exemplary screenshot of a user interface for generating a party in the game during the process of FIG. 2.

FIG. 3 is an exemplary screenshot of a user interface for generating a party in the game during the process of FIG. 2.

Referring to FIG. 2 and FIG. 3, after generating a party in the online game (S20), the recruiting user terminal 30 transmits the created party, and the game server 10 stores it (S30). That is, the game server 10 stores the party generated by the recruiting user terminal 30 (S30).

In the present exemplary embodiment, the recruiting user terminal 30 may generate a party by selecting an activity according to the quest performance state of the recruiting user himself/herself in the online game. At this time, the activity may include a specific quest, a specific monster subjugate, a siege warfare, and the like.

Then, the recruiting user terminal 30 creates a party member recruitment announcement to induce participation in the party (S40), and transmits it to the external server 20, and the external server 20 stores the recruitment invitation and publishes it to public (S50). That is, the external server 20 stores the party member recruitment announcement created by the recruiting user terminal 30 and posts it to at least one external terminal connected thereto (S50).

In the present exemplary embodiment, the party member recruitment announcement includes not only information on what activities the party performs together with, but also information on the participation condition for joining the party and minimum number of party members for performing the activity together. At this time, the participation condition may include at least one of a participant's game level, item holding status, residence area, age, and affiliation.

Figure 4:
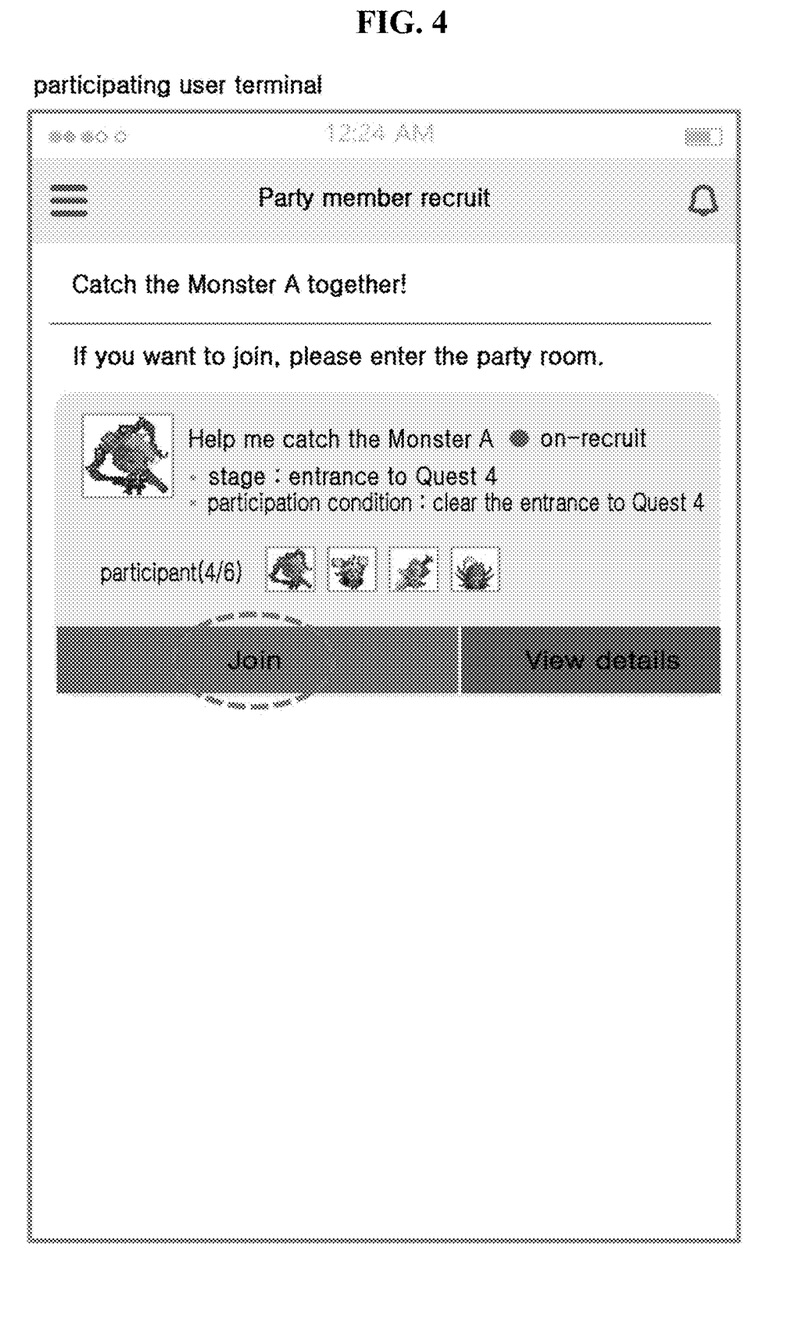
FIG. 4 is an exemplary screenshot of user interface for participating in a party in the method of FIG. 2.

FIG. 4 is an exemplary screenshot of user interface for participating in a party in the method of FIG. 2.

Referring to FIGS. 2 and 4, when the participating user terminal 40 is connected to the external server 20, the participating user terminal 40 receives the party member recruitment announcement from the external server 20 (S60). Meanwhile, the party member recruitment announcement may include a 'Join' button for participation and a 'View detail' button for providing detailed information about the party.

Then, when the participating user terminal 40 receives a user input of participation in the party by user touching the Join button (S70), the participating user terminal 40 transmits user game information for participating in the party to the server 10 (S80). That is, the game server 10 may receive the user game information from the participating user terminal 40 and store the received user game information. At this time, the user game information may include at least one of a game level, an item holding state, a residence area, an age, and an affiliation of the corresponding participant, for example.

Meanwhile, when a participating user clicks the View detail button through the participant user terminal 40, the participant user terminal 40 receives detailed information on the party, for example, activity of the party, party leader, members and the available number of new participant from the game server 10 and displays the detailed information.

Then, the game server 10 determines whether the user game information provided from the participating user terminal 40 satisfies the participation condition included in the party member recruitment announcement (S90).

If the game server 10 determines that the user game information is not satisfied with the participation condition as a result of the determination in step S90, it transmits a participation rejection message to the participating user terminal 40 (S100). That is, the participating user terminal 40 receives and displays the participation rejection message from the game server 10.

Figure 5:
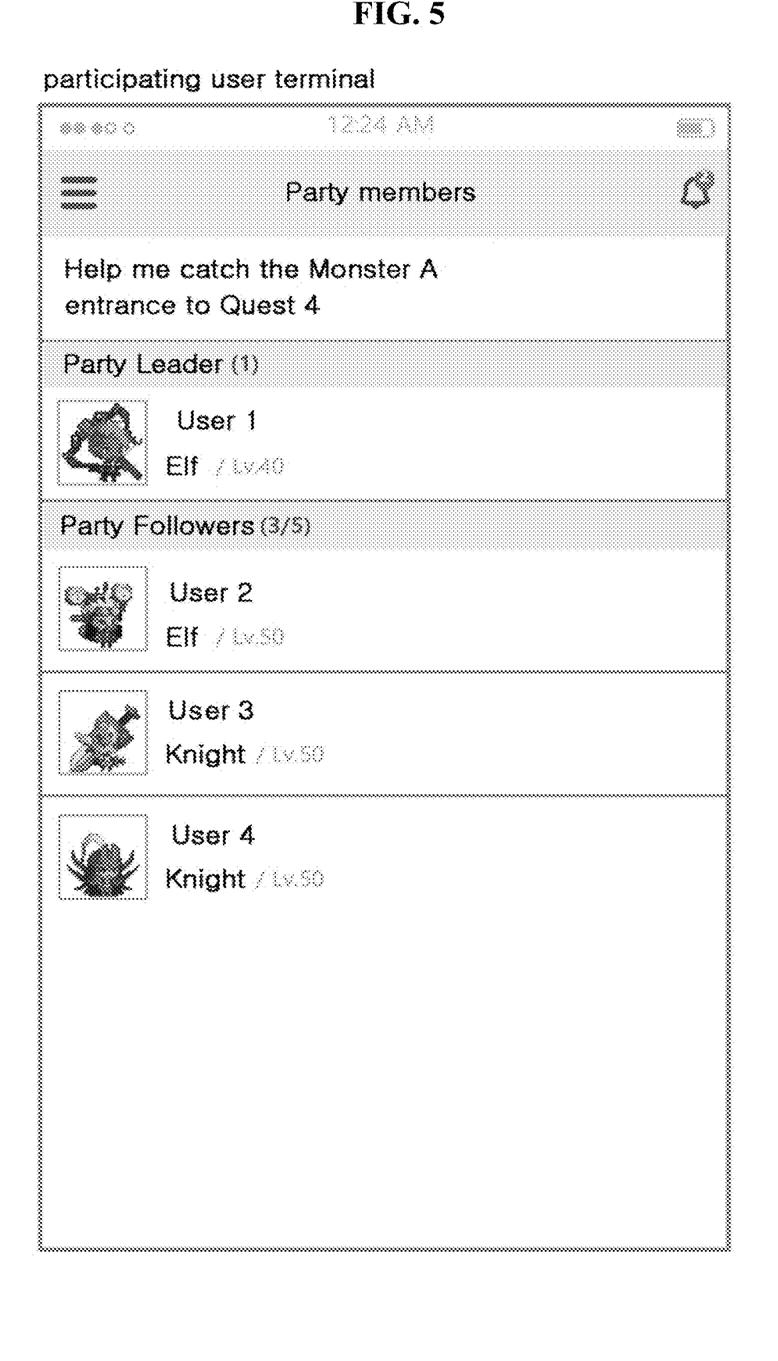
FIG. 5 is an exemplary screenshot of a user interface displaying information on the party members who is allowed to participate in the party.

FIG. 5 is an exemplary screenshot of a user interface displaying information on the party members who is allowed to participate in the party.

Referring to FIG. 2 and FIG. 5, the game server 10 transmits a participation permission message if the game server 10 determines that the user game information satisfies the participation condition as a result of the determination in step S90, (Step S110). That is, the participating user terminal 40 receives and displays the participating permission message from the game server 10. At this time, the information provided to the participating user terminal 40 may include information on the user who is allowed to participate in the party, for example, activity of the party, party leader, members and the like.

In the present exemplary embodiment, the game server 10 may transmit information on the user who is allowed to participate in the party not only to the participating user terminal 40 but also to the recruiting user terminal 30. Accordingly, the recruiting user who created the party can quickly and conveniently check who the newly added party member is.

Figure 6:
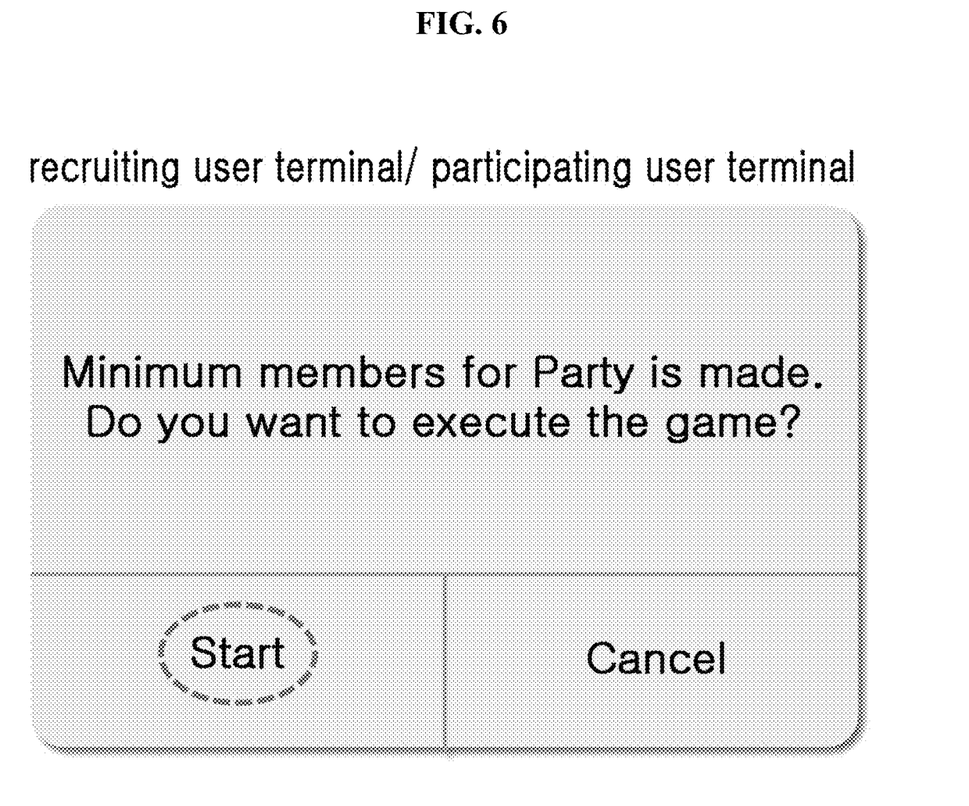
FIG. 6 is an exemplary screenshot of user interface for executing the game in association with the party.

FIG. 6 is an exemplary screenshot of user interface for executing the game in association with the party.

Referring to FIG. 2 and FIG. 6, the game server 10 determines whether the number of users allowed to participate in the party is greater than or equal to the minimum number for executing the online game through the party (S120).

As a result of the determination in step S120, if the game server 10 determines that the number of users allowed to participate in the party is less than the minimum number, the game server 10 may repeat the process after step S80. That is, the game server 10 may collect game user information for a new participating user until the number of users allowed to participate in the party reaches the minimum number.

On the other hand, if it is determined in step S120 that the number of users allowed to participate in the party is greater than or equal to the minimum number, the game server 10 a party executable message to the recruiting user terminal 30 and the participating user terminal 40 (S130 and S140). That is, each of the recruiting user terminal 30 and the participating user terminal 40 can receive and display a party executable message from the game server 10.

Then, when the recruiting user terminal 30 receives a user input selecting the 'start' button included in the party executable message, the recruiting user terminal 30 immediately performs the online game in association with the party (S150).

Also, the participating user terminal 40 immediately performs the online game in association with the party in response to receiving a user input selecting the 'start' button included in the party executable message the 'start button' included in the executable message (S160). At this time, the online game must be installed in the participating user terminal 40 in advance. On the other hand, if the online game is not installed in the participating user terminal 40, the participating user terminal 40 may manually or automatically install the online game and immediately perform the online game in association with the party.

As described above, according to the present exemplary embodiment, the recruiting user terminal 30 generates a party of an online game in the game server 10, and post a party member recruitment announcement to an external server 20 for recruiting a user who wants to participate in the party. Therefore, at least one participating user terminal 40 connected to the external server 20 can easily participate in the party through the party member recruitment announcement, and if the user game information for the participating user is satisfied with the participation condition included in the party member recruitment announcement, the user may automatically participate as a member of the party. Also when the number of users allowed to participate in the party is more than or equal to a minimum number, players can quickly perform the online game in association with the party.

From the standpoint of the recruiting user who has created the party, the recruiting user can advertise the recruitment of the party member through the external server 20 that provides the external communication service, not through the service in the online game, and allow only the user who satisfies the above-described condition to participate in the party.

In addition, from the standpoint of a participating user wishing to participate in the party, it is possible to read the party member recruitment message through a different path, i.e., the external server 20, for example, the Web/App/SNS, and to participate in a party desired by the party even if the participating user is not always connected to the game server 10 through the terminal.

The above-described method descriptions and the process flow diagrams are provided as illustrative examples and are not intended to require or imply that the steps of the various exemplary embodiments must be performed in the order presented. Instead, the order of steps in the foregoing exemplary embodiments may be performed in any order. Words such as "after", "then," "next," etc. are merely intended to aid the reader through description of the methods.

The various illustrative logical blocks, units, modules, circuits, and algorithm steps described in connection with the exemplary embodiments may be implemented as electronic hardware, computer software, or combinations of both. In order to describe the interchangeability of hardware and software, various illustrative features, blocks, units, modules, circuits, and steps have been described above in terms of their general functionality. Whether such functionality is implemented as hardware or software depends upon the particular application and design constraints for the overall system. A person of ordinary skill in the art may implement the functionality in various ways for each particular application without departing from the scope of the invention.

The hardware such as the servers 10 and 20 and the terminals 30 and 40 used to implement the various illustrative logics, logical blocks, units, modules, and circuits described in connection with the exemplary embodiments disclosed herein may be implemented or performed with a general purpose processor, a digital signal processor (DSP) an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory processor-readable storage medium or a non-transitory computer-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disc includes optically reproducible data such as a compact disc (CD), laser disc, optical disc, digital versatile disc (DVD), and blu-ray disc. Disk includes magnetically reproducible data such as a floppy disk. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent is arrangements.

What is claimed is:

1. A game system comprising:
    a game server configured for providing an online game to a set of participating users;
    an external server configured for providing a social network service to a general public, the external server not connected to the game server;
    a recruiting user terminal configured for creating a party of the online game, transmitting the generated party to the game server, creating a party member recruitment announcement comprising information on a participation condition of the party, and transmitting the party member recruitment announcement to the external server; and
    at least one participating user terminal of a potential participating user configured for receiving the party member recruitment announcement from the external server and transmitting user game information of the potential participating user for participating in the party to the game server in response to the received party member recruitment announcement,
    wherein the game server is configured to receive the user game information of the potential participating user, determine whether the user game information of the potential participating user satisfies the participation condition, and transmit a participating admission message to the participating user terminal if the user game information of the potential participating user satisfies the participation condition.

2. The game system of claim 1,
    wherein the game server is configured to transmit information on a user who is allowed to participate in the party to the recruiting user terminal.

3. The game system of claim 1,
    wherein the game server is configured to transmit to the participating user terminal a participation rejection message to the party when the user game information is judged not to satisfy the participation condition.

4. The game system of claim 1,
wherein the game server is configured to transmit a party executable message to the participating user terminal of the user allowed to participate in the party if it is determined that the number of users allowed to participate in the party is greater than or equal to a minimum number for executing the online game in association with the party.

5. A method for providing a game service performed by a game server providing an arbitrary online game to a set of participating users, the method comprising:
receiving a party of the online game from a recruiting user terminal;
receiving user game information of a potential participating user for participating in the party from at least one participating user terminal of the potential participating user which has received a party member recruitment announcement from an external server not connected to the game server, the party member recruitment announcement comprising information on a participation condition to the party and the external server configured to provide a social network service to a general public;
determining whether the user game information of the potential participating user satisfies the participation condition; and
transmitting to the participating user terminal a participation admission message to the party if the user game information satisfies the participation condition.

6. The method of claim 5, further comprising transmitting information on a user who is allowed to participate in the party to the recruiting user terminal or the participating user terminal.

7. The method of claim 5, further comprising transmitting to the participating user terminal a participation rejection message if it is determined that the user game information does not satisfy the participation condition.

8. The method of claim 5, further comprising transmitting a party executable message to the participating user terminal of the user allowed to participate in the party if it is determined that a number of users allowed to participate in the party is greater than or equal to a minimum number for executing the online game in association with the party.

* * * * *